US009260013B2

(12) United States Patent  
Kume et al.

(10) Patent No.: US 9,260,013 B2  
(45) Date of Patent: Feb. 16, 2016

(54) AWARENESS LEVEL IMPROVEMENT DEVICE

(71) Applicant: DENSO CORPORATION, Kariya, Aichi-pref. (JP)

(72) Inventors: Takuya Kume, Nagoya (JP); Takahiro Naito, Anjo (JP); Yukari Ito, Kariya (JP); Shinya Matsunaga, Kariya (JP); Kiyotaka Taguchi, Kariya (JP); Hiroshi Morimoto, Chiryu (JP)

(73) Assignee: DENSO CORPORATION, Kariya (JP)

( * ) Notice: Subject to any disclaimer, the term of this patent is extended or adjusted under 35 U.S.C. 154(b) by 1 day.

(21) Appl. No.: 14/245,164

(22) Filed: Apr. 4, 2014

(65) Prior Publication Data

US 2014/0300478 A1 Oct. 9, 2014

(30) Foreign Application Priority Data

Apr. 8, 2013 (JP) .................................. 2013-80479

(51) Int. Cl.  
*G08B 23/00* (2006.01)  
*B60K 28/06* (2006.01)

(52) U.S. Cl.  
CPC .......... *B60K 28/066* (2013.01); *B60W 2540/22* (2013.01); *B60Y 2302/03* (2013.01); *B60Y 2400/90* (2013.01)

(58) Field of Classification Search  
CPC ............ G08B 231/06; G06K 9/00845; B60W 2040/0818  
USPC ........................... 340/575, 576, 439; 180/272  
See application file for complete search history.

(56) References Cited

U.S. PATENT DOCUMENTS

| 5,488,353 | A | * | 1/1996 | Kawakami et al. | ........... 340/576 |
| 7,438,418 | B2 | * | 10/2008 | Marshall | ........................ 351/246 |
| 2009/0132109 | A1 | | 5/2009 | Galley et al. | |
| 2009/0318776 | A1 | * | 12/2009 | Toda et al. | .................... 600/301 |
| 2010/0219955 | A1 | * | 9/2010 | Demirdjian et al. | ........... 340/575 |
| 2011/0313259 | A1 | * | 12/2011 | Hatakeyama et al. | ........ 600/300 |
| 2013/0253841 | A1 | | 9/2013 | Matsunaga et al. | |

FOREIGN PATENT DOCUMENTS

| JP | 06-171393 A | 6/1994 |
| JP | 2005-104237 A | 4/2005 |
| JP | 2005-141315 A | 6/2005 |
| JP | 2005-204829 A | 8/2005 |
| JP | 2005-352895 A | 12/2005 |

(Continued)

OTHER PUBLICATIONS

Office Action mailed Mar. 24, 2015 issued in corresponding JP patent application No. 2013-080479 (and English translation).

*Primary Examiner* — Phung Nguyen  
(74) *Attorney, Agent, or Firm* — Posz Law Group, PLC

(57) ABSTRACT

An awareness level improvement device has an input portion, a determination portion, and a controller. Data related to the awareness level of the driver is input into the input portion. The determination portion determines whether the driver is in a absentminded state based on the data input into the input portion. The controller controls an execution portion to execute an application improving the awareness level of the driver when the determination portion determines that the driver is driving in the absentminded state. The application includes a body motion application that prompts the driver to perform a body motion.

20 Claims, 10 Drawing Sheets

| | LOW-STIMULUS GROUP | HIGH-STIMULUS GROUP |
|---|---|---|
| VISUAL SENSE<br>HEARING SENSE<br>TOUCHING SENSE | [FIRST CLASS: COGNITION]<br>A1<br>A2 | [THIRD CLASS:<br>COGNITION + AFFECT]<br>A5<br>A6 |
| PROPRIOCEPTIVE SENSE | [SECOND CLASS: BODY MOTION]<br>A3<br>A4 | [FOURTH CLASS:<br>BODY MOTION + AFFECT]<br>A7 |
| | | AFFECT |

SMALL ←———— IMPROVEMENT EFFECT (STIMULUS) ————→ LARGE

(56) References Cited

FOREIGN PATENT DOCUMENTS

| | | |
|---|---|---|
| JP | 2007-075342 A | 3/2007 |
| JP | 2008-035964 A | 2/2008 |
| JP | 2009-048605 A | 3/2009 |
| JP | 2013-140508 A | 7/2013 |

* cited by examiner

| | LOW-STIMULUS GROUP | HIGH-STIMULUS GROUP |
|---|---|---|
| VISUAL SENSE<br>HEARING SENSE<br>TOUCHING SENSE | [FIRST CLASS: COGNITION]<br>A1<br>A2 | [THIRD CLASS:<br>COGNITION + AFFECT]<br>A5<br>A6 |
| PROPRIOCEPTIVE<br>SENSE | [SECOND CLASS: BODY MOTION]<br>A3<br>A4 | [FOURTH CLASS:<br>BODY MOTION + AFFECT]<br>A7 |
| | | AFFECT |

SMALL ←——————— IMPROVEMENT EFFECT (STIMULUS) ———————→ LARGE

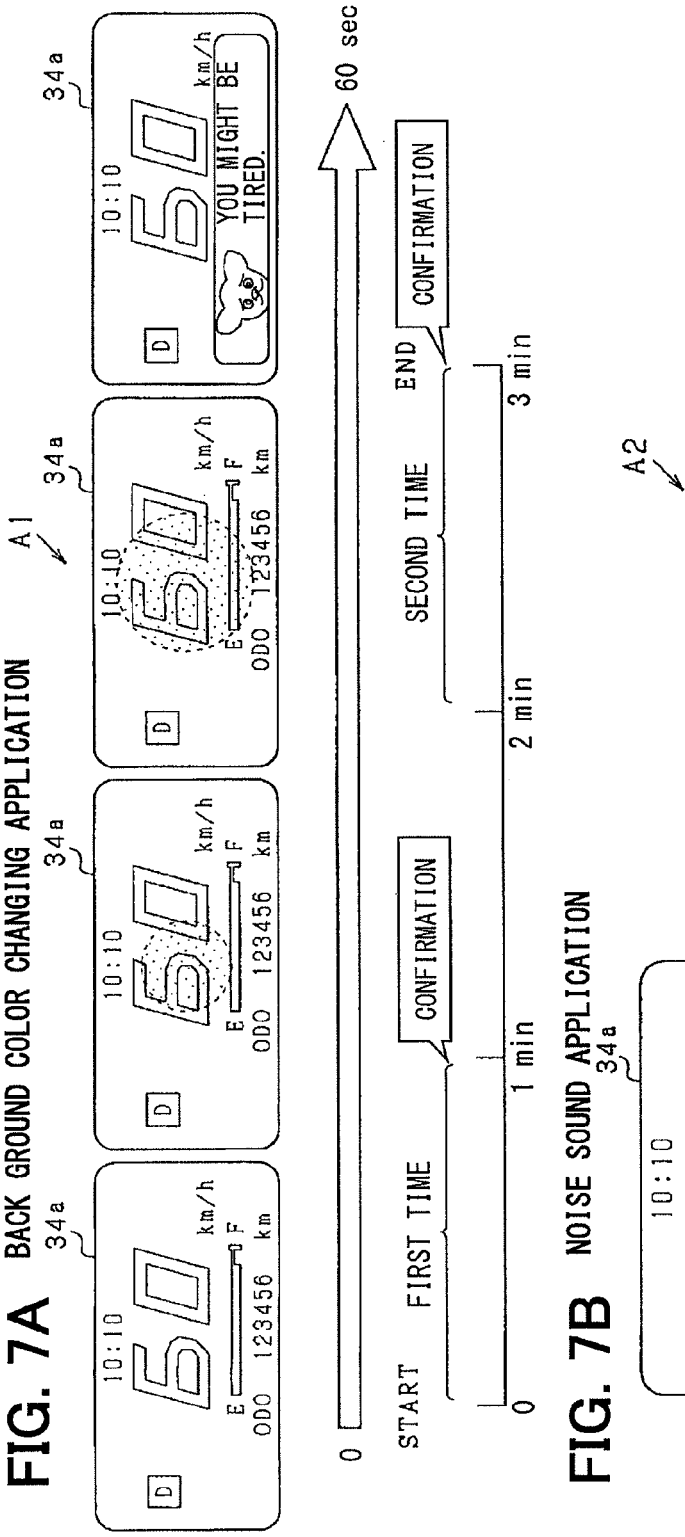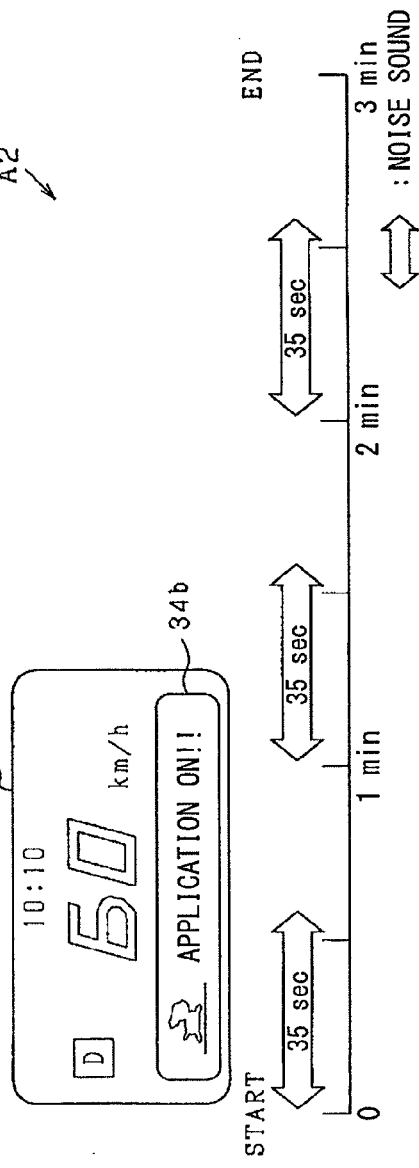

FIG. 8A DRIVING EXERCISE APPLICATION
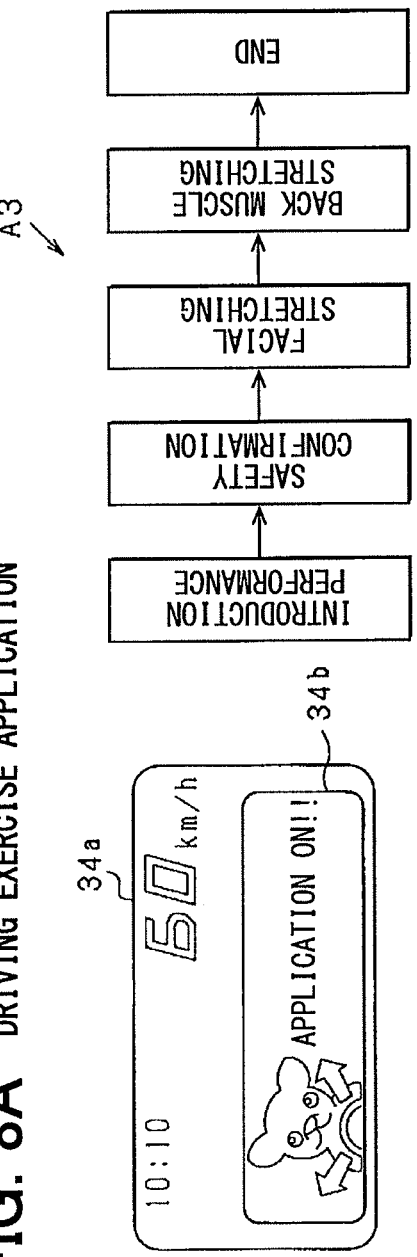
FIG. 8B PRONOUNCING APPLICATION
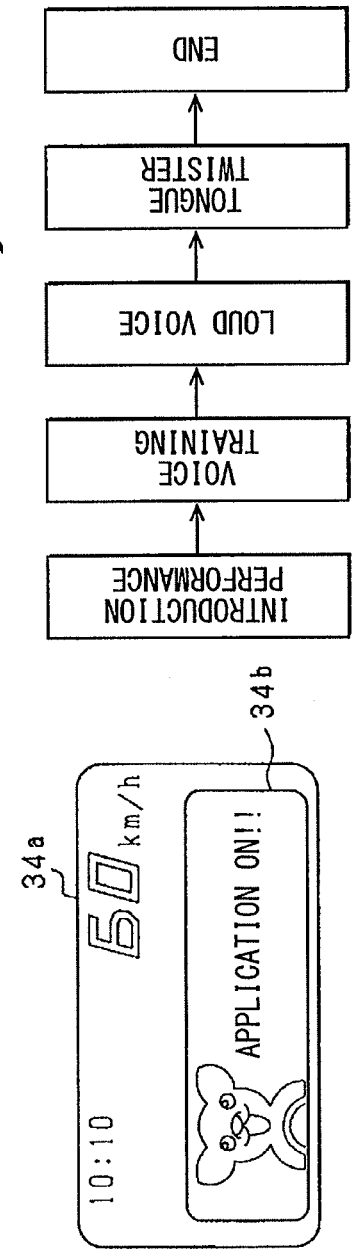

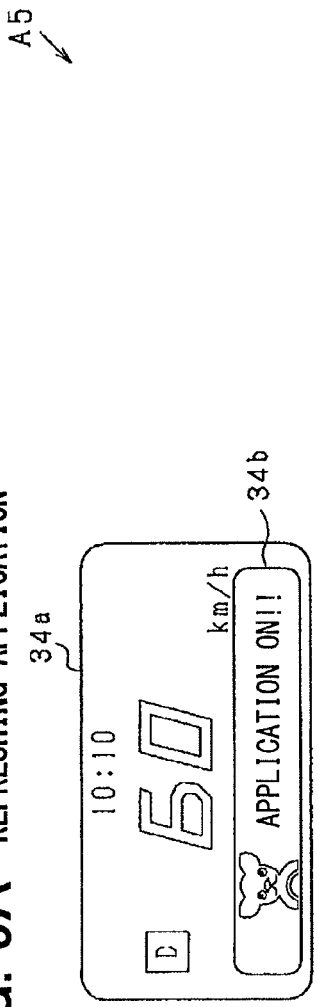
FIG. 9A REFRESHING APPLICATION
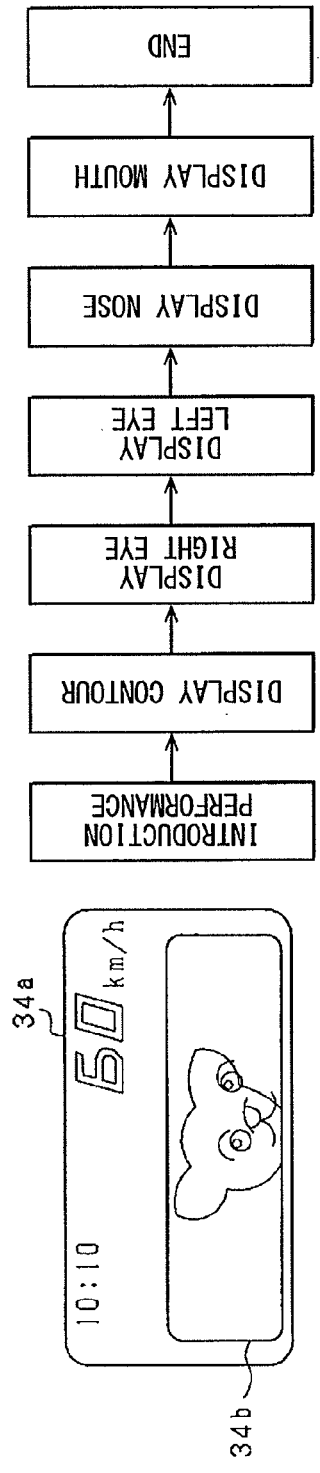
FIG. 9B CHARACTER APPLICATION

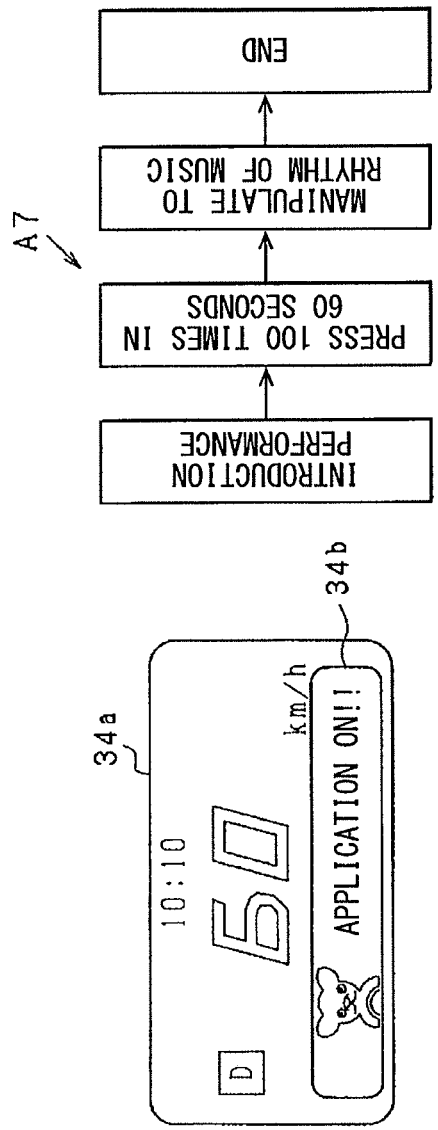

AWARENESS LEVEL IMPROVEMENT DEVICE

CROSS REFERENCE TO RELATED APPLICATION

This application is based on and incorporates herein by reference Japanese Patent Application No. 2013-80479 filed on Apr. 8, 2013.

TECHNICAL FIELD

The present disclosure relates to an awareness level improvement device for improving an awareness level of a driver while driving a vehicle.

BACKGROUND

A device for prompting a driver to confirm the driver's attention to driving has been conventionally known. The device detects a decrease in the driver's attention to driving according to driving information such as a vehicle speed, an acceleration, a steering angle or the like, which is detected by sensors. For example, a patent document (JP 2005-104237 A) discloses a drowsy driving prevention device. In the drowsy driving prevention device, an air conditioner blows cold air toward a driver when the device detects a decrease in the driver's attention to driving. Since the driver is exposed to the cold air, an awareness level of the driver increases, and thus, the driver can be prevented from falling into a drowsy driving state.

However, the drowsy driving prevention device in the patent document just provides the cold air when the decrease in the driver's attention is detected. Therefore, the effects for improving the awareness level of the driver may not last a long time. Further, although the drowsy driving prevention device detects the drowsy driving of the driver, the device does not detect an absentminded state in which the driver is not in the drowsy driving state but in a low awareness level state.

SUMMARY

It is an objective of the present disclosure to provide an awareness level improvement device that efficiently improves an awareness level of a driver and prevents an absentminded state of the driver.

According to a first aspect of the present disclosure, an awareness level improvement device for improving an awareness level of a driver has an input portion, a determination portion, and a controller. Data related to the awareness level of the driver is input into the input portion. The determination portion determines whether the driver is driving in an absentminded state, in which the awareness level of the driver is higher than that of a drowsy driving state and lower than that of a normal driving state, based on the data input into the input portion. The controller controls an execution portion to execute an application improving the awareness level of the driver when the determination portion determines that the driver is driving in the absentminded state. The application includes a body motion application that prompts the driver to perform a body motion.

The controller executes the application improving the awareness level of the driver when the determination portion determines the absentminded state. The application includes the body motion application prompting the driver to perform the body motion. Therefore, the awareness level of the driver can be improved when the driver performs the body motion according to the body motion application.

Further, the determination portion determines whether the driver is driving in the absentminded state in which the awareness level of the driver is higher than that in the drowsy driving state and lower than that in the normal state. Therefore, the awareness level improvement device can improve the awareness level of the driver before the driver falls into the drowsy driving state. Thus, driving safety is improved.

According to a second aspect of the present disclosure, the body motion application prompts the driver to make a safety confirmation involving movement of a sightline of the driver.

Since the body motion application prompts the driver to make the safety confirmation involving movement of the sightline of the driver, the driver can confirm safety driving while improving the awareness level.

According to a third aspect of the present disclosure, the body motion application prompts the driver to vocally respond.

Therefore, the awareness level of the driver can be improved when the driver vocally responds according to the application.

BRIEF DESCRIPTION OF THE DRAWINGS

The disclosure, together with additional objectives, features and advantages thereof, will be best understood from the following description, the appended claims and the accompanying drawings, in which:

FIG. 7A is a diagram illustrating a background color changing application;
FIG. 7B is a diagram illustrating a noise sound application;
FIG. 8A is a diagram illustrating a driving exercise application;
FIG. 8B is a diagram illustrating a pronouncing application;
FIG. 9A is a diagram illustrating a refreshing application;
FIG. 9B is a diagram illustrating a character application;
FIG. 10 is a diagram illustrating a button operation application.

DETAILED DESCRIPTION

Next, the awareness level improvement device 10 (hereinafter "the device 10") according to the present embodiment will be described. In the present embodiment, a case where the device 10 is applied to an automobile (i.e., vehicle) will be described.

The device 10 determines whether a driver is driving in an absentminded state, in which an awareness level of the driver (i.e., a consciousness level of the driver) is low. When the device 10 determines the absentminded state, the device 10 executes applications A1 to A7 to improve the awareness level of the driver.

In the present embodiment, "the absentminded state" may indicate a consciousness level of a driver during driving. More specifically, the absentminded state may be a state in which the awareness level of a driver (hereinafter "the drive's awareness level") is higher than that in a drowsy driving state in which the driver is sleepy or sleeping. But the driver's awareness level in the absentminded stated is lower than that in a normal state (i.e., a regular state) in which the driver is fully conscious (i.e., not sleepy). Further, the absentminded state may be defined as a state in which, although a driver devotes his attention to nothing but driving, the attention itself devoted to the driving is relatively low. More specifically, the absentminded state may be defined as a state in which a driver is not paying full attention while driving. In the present disclosure, the absentminded state may include a pre-drowsy driving state in which a driver does not fall asleep but feels a little sleepy.

Figure 1:
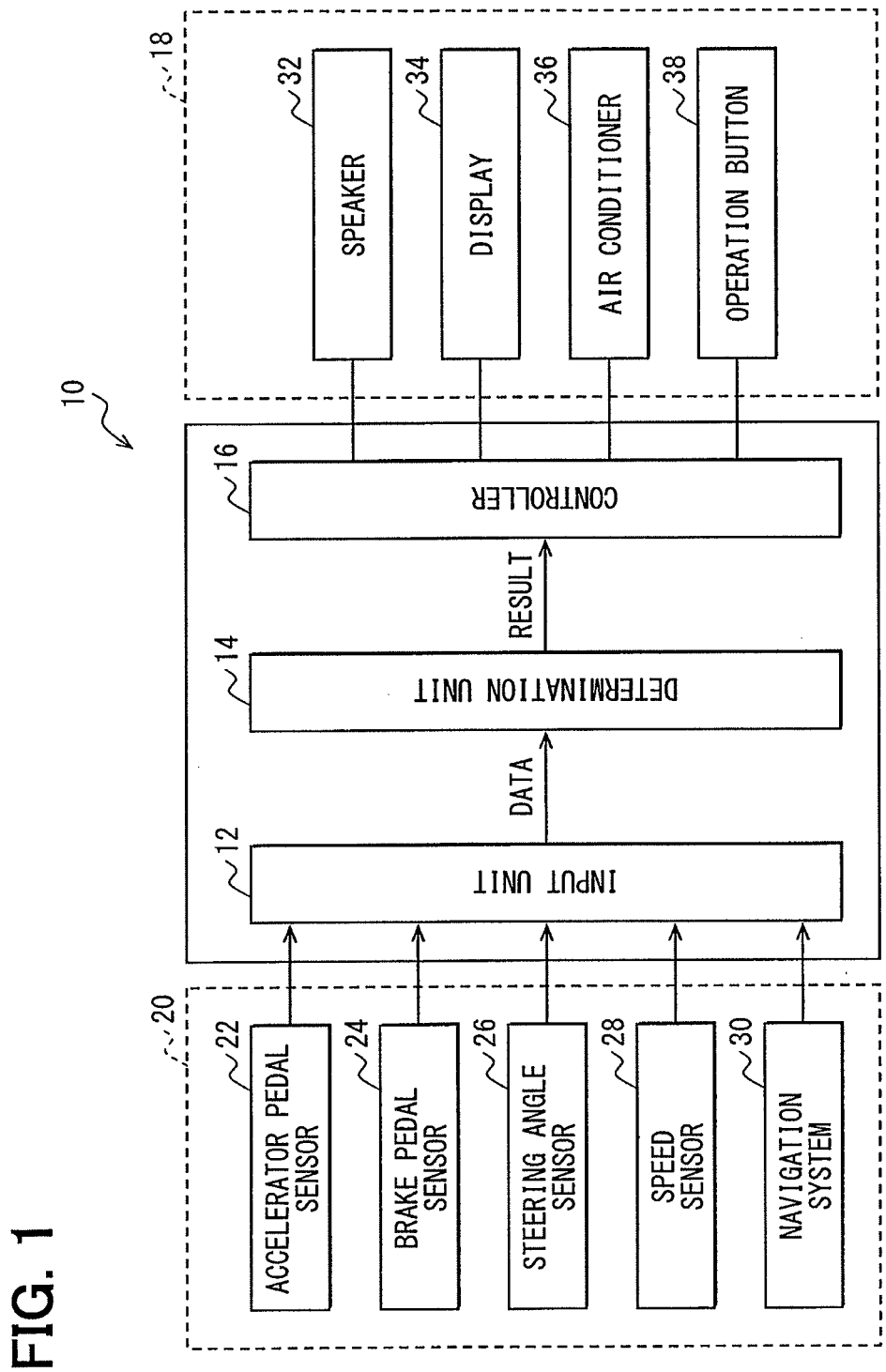
FIG. 1 is a block diagram illustrating a control configuration of an awareness level improvement device in the embodiment.

FIG. 1 is a block diagram illustrating a control configuration of the device 10 according to the present disclosure. The device 10 includes an input unit 12 (i.e., an input portion), a determination unit 14 (i.e., a determination portion), and a controller 16. When the device 10 determines that the driver is driving in the absentminded state, the device 10 controls an execution unit 18 (i.e., an execution portion) to execute the applications A1 to A7. The device 10 may be constituted with an electronic control unit having CPU, ROM, RAM, and so on, which are not shown.

(Input Unit 12)

The input unit 12 receives data used for determining the driver's awareness level. The data includes driving state information indicating a driving state of the vehicle and road information. The driving state information and the road information are detected by a detection unit 20 (detection part) provided to the vehicle. The detection unit 20 may include an accelerator pedal sensor 22, a brake pedal sensor 24, a steering angle sensor 26, a speed sensor 28, and a navigation system 30.

The accelerator pedal sensor 22 detects values of accelerator pedal position (i.e., an accelerator pedal depressing amount). The brake pedal sensor 24 detects values of brake pedal position (i.e., a brake pedal depressing amount). The steering angle sensor 26 detects steering angles of a steering 40. The speed sensor 28 detects vehicle speed. The navigation system 30 detects a type of a road on which the vehicle is traveling. Specifically, the navigation system 30 determines whether the vehicle is traveling on a freeway or a general road (i.e., a road except for the freeway).

The input unit 12 outputs the data to the determination unit 14.

(Determination Unit 14)

The determination unit 14 determines whether the driver is driving in the absentminded state based on the data input from the input unit 12. The determination unit 14 has a memory device (not shown) to store the data input from the input unit 12 The determination unit 14 calculates parameters as listed below using the data stored in the memory device.

Parameter Pa1: an average vehicle speed for the most recent 10 minutes (km/h)

Parameter Pa2: an average variation of the vehicle speed for the most recent 10 minutes (km/h/s)

Parameter Pb1: an absolute value of an average steering angle for the most recent 10 minutes (deg)

Parameter Pb2: an average of a variation steering angle for the most recent 10 minutes (deg/s)

Parameter Pc1: an average accelerator pedal depressing amount for the most recent 10 minutes (%)

Parameter Pc2: an average variation of the accelerator pedal depressing amount for the most recent 10 minutes (%/s)

Parameter Pd1: an average brake pedal depressing amount for the most recent 10 minutes (%)

Parameter Pd2: an average variation of the brake pedal depressing amount for the most recent 10 minutes (%/s)

Regarding the Parameter Pa2, "an average variation of the vehicle speed for the most recent 10 minutes" is defined as described below. The vehicle speed is detected every predetermined time $\Delta t$ (e.g., 500 msec) within 10 minutes. For example, the vehicle speed detected is v1, v2, v3, etc. (km/h) at each time T1, T2, T3, etc. Then, each absolute value of a variation of the vehicle speed from a time Ti to T(i+1) (i=1, 2, 3, etc.) is sequentially integrated for 10 minutes as below.

$$|v2-v1|+|v3-v2|+|v4-v3|+|v5-v4|+|v6-v5|+\ldots$$

The integration is carried out for 10 minutes to calculate an integrated value. Then, the Parameter Pa2 is calculated by converting the integrated value per second, i.e., by dividing the integrated value with 600 (i.e., 60 sec×10 min) (sec).

Regarding the Parameter Pb2, "an average variation of the steering angle for the most recent 10 minutes" is similarly defined as the definition of the Parameter Pa2. That is, the Parameter Pb2 is defined by changing the term of "the vehicle speed" into "the steering angle" in the definition of the Parameter Pa2 as described above.

Regarding the Parameter Pc2, "an average variation of the accelerator pedal depressing amount for the most recent 10 minutes" is similarly defined as the definition of the Parameter Pa2. That is Parameter Pc2 is defined by changing the term of "the vehicle speed" into "the accelerator pedal depressing amount" in the definition of the Parameter Pa2.

Regarding the Parameter Pd2, "an average variation of the brake pedal depressing amount for the most recent 10 minutes" is similarly defined as the definition of the Parameter Pa2. That is Parameter Pd2 is defined by changing the term of "the vehicle speed" into "the brake pedal depressing amount" in the definition of the Parameter Pa2.

Regarding the Parameter Pb1, "an absolute value of an average steering angle for the most recent 10 minutes" is defined as described below. The steering angle in the right direction is detected as a positive value and the steering angle in the left direction is detected as a negative value. Next, the average steering angle is calculated for the most recent 10 minutes. And then, an absolute value of the average steering angle corresponds to "an absolute value of an average steering angle for the most recent 10 minutes".

The Parameter Pc1 is defined such that the value of the Parameter Pc1 is "0%" when a driver does not depress an accelerator pedal (not shown) at all, and the value of the Parameter Pc1 is "100%" when the driver fully depresses the accelerator pedal.

The Parameter Pd1 is defined such that the value of the Parameter Pd1 is "0%" when the driver does not depress an brake pedal (not shown) at all, and the value of the Parameter Pd1 is "100%" when the driver fully depresses the brake pedal.

The determination unit 14 determines whether conditions (A) to (D) as described below are satisfied using the above described Parameters. The hatched regions in FIGS. 2A to 2D respectively show regions where the conditions (A) to (D) are satisfied.

Figure 2A:
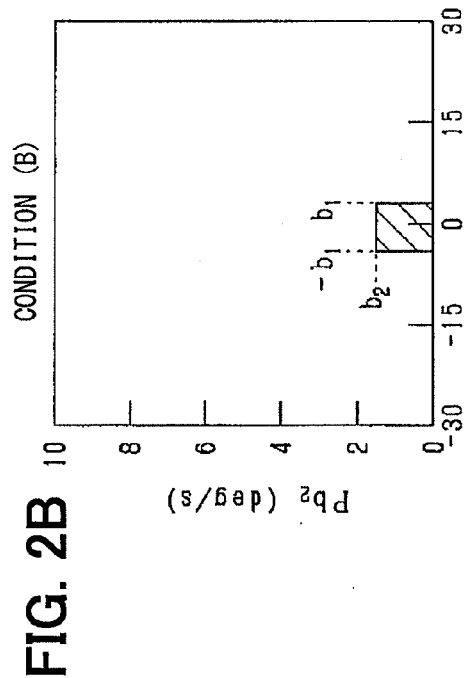
FIG. 2A is a graph depicting a condition (A)

As shown FIG. 2A, the condition (A) is defined such that the Parameter Pa1 (i.e., the average vehicle speed for the most recent 10 minutes) is equal to or greater than a specified lower limit a1 and the Parameter Pa2 (i.e., the average variation of the vehicle speed for the most recent 10 minutes) is equal to or less than a specified upper limit a2. The values of the lower limit a1 and the upper limit a2 may be respectively 70 km/h and 0.85 km/h/s, for example.

Figure 2C:
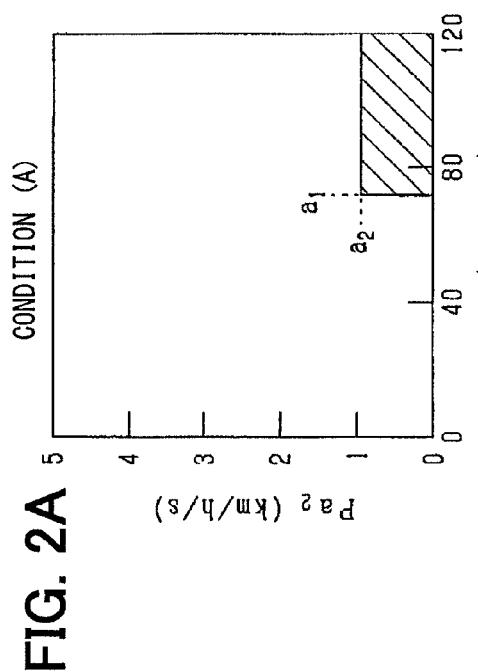
FIG. 2C is a graph depicting a condition (C)
Figure 2B:
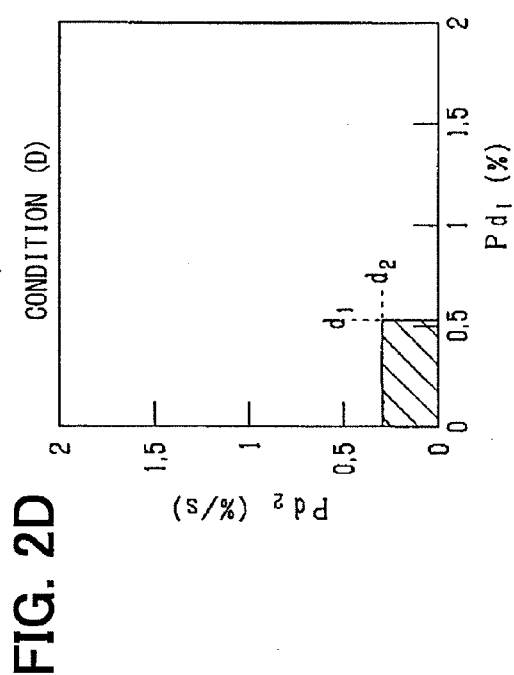
FIG. 2B is a graph depicting a condition (B)

As shown FIG. 2B, the condition (B) is defined such that the Parameter Pb1 (i.e., the absolute value of the average steering angle for the most recent 10 minutes) is equal to or less than a specified upper limit b1 and the Parameter Pb2 (i.e., the average variation of the steering angle for the most recent 10 minutes) is equal to or less than a specified upper limit b2. The values of the upper limit b1 and the upper limit b2 may be respectively 10 deg and 1.28 deg/s, for example.

As shown in FIG. 2C, the condition (C) is defined such that the Parameter Poi (i.e., the average accelerator pedal depressing amount for the most recent 10 minutes) falls within a scope between a specified lower limit c1 and a specified upper limit c2 and the Parameter Pc2 (i.e., the average variation of the accelerator pedal depressing amount for the most recent 10 minutes) is equal to or less than a specified upper limit c3. The values of the lower limit c1, the upper limit c2, and the upper limit c3 may be respectively 6%, 12%, and 5.5%/s, for example.

Figure 2D:
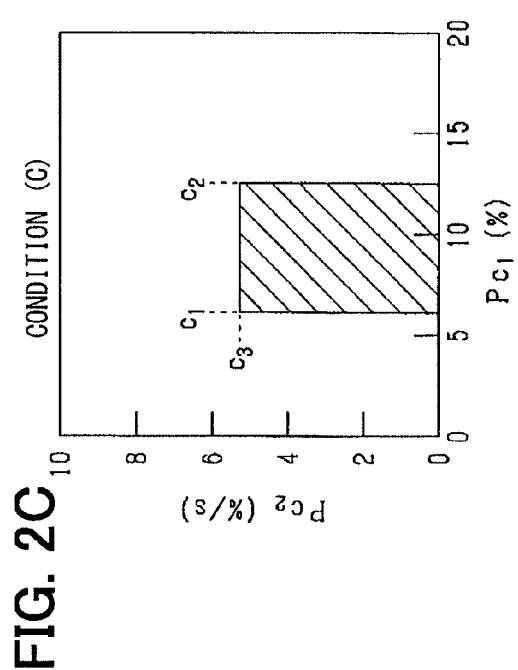
FIG. 2D is a graph depicting a condition (D)

As shown in FIG. 2D, the condition (D) is defined such that the Parameter Pd1 (i.e., the average brake pedal depressing amount for the most recent 10 minutes) is equal to or less than a specified upper limit d1 and the Parameter Pd2 (i.e., the average variation of the brake pedal depressing amount for the most recent 10 minutes) is equal to or less than a specified upper limit d2. The values of the upper limit d1 and the upper limit d2 may be respectively 0.5% and 0.3%/s, for example.

The determination unit 14 determines that the driver is driving in the absentminded state when (i) at least 3 conditions among the conditions (A) to (D) are satisfied and (ii) both the condition (A) and the condition (B) are satisfied. On the other hand, the determination unit 14 determines that the driver is not in the absentminded state (i.e., the driver is in the normal state) when (i) not more than two conditions among the conditions (A) to (D) are satisfies or (ii) at least 3 conditions among the conditions (A) to (D) are satisfied but both the condition (A) and the condition (B) are not satisfied.

Next, in order to confirm a correlation between the satisfaction of the conditions (A) to (D) and the absentminded state of the driver, experimentation was conducted as described below. The vehicle speed, the steering angle, the accelerator pedal depressing amount, and the brake pedal depressing amount were detected while a test driver drove the vehicle on variety of roads. An examiner asked the test driver whether the test driver was in the absentminded state every 3 minutes while driving and obtained answers from the test driver. The Parameters Pa1, Pa2, Pb1, Pb2, Pc1, Pc2, Pd1, and Pd2 were calculated and the answers from the test driver were related to the Parameters calculated.

Figure 3A:
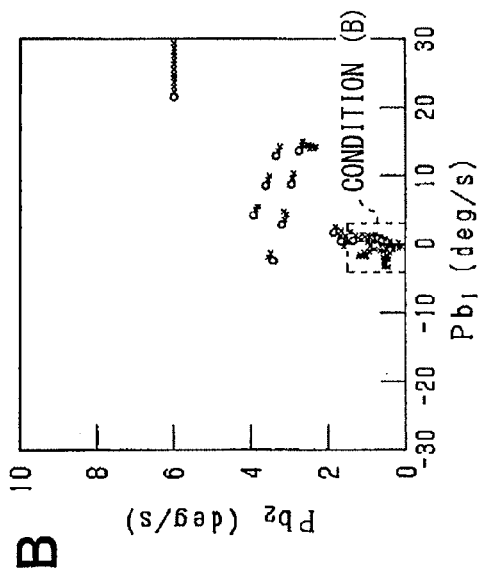
FIG. 3A is a graph of a correlation between the condition (A) and a state of a driver.
Figure 3B:
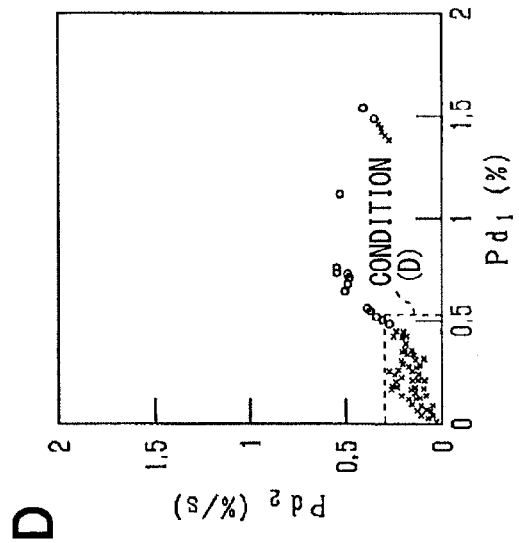
FIG. 3B is a graph of a correlation between the condition (B) and a state of the driver.
Figure 3C:
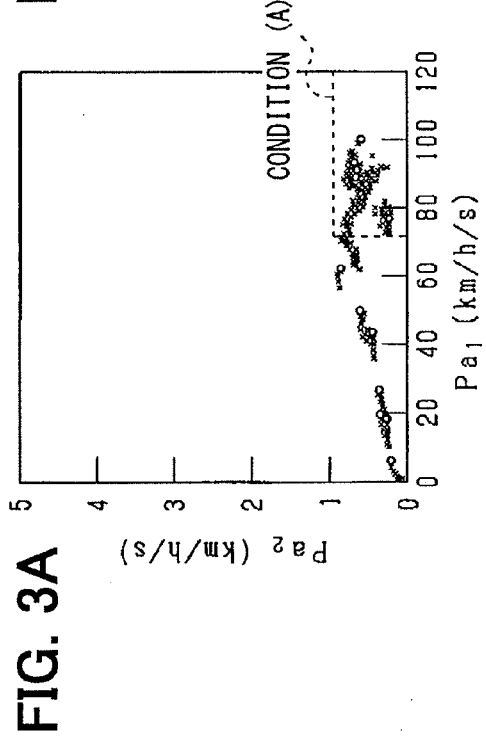
FIG. 3C is a graph of a correlation between the condition (C) and a state of the driver.
Figure 3D:
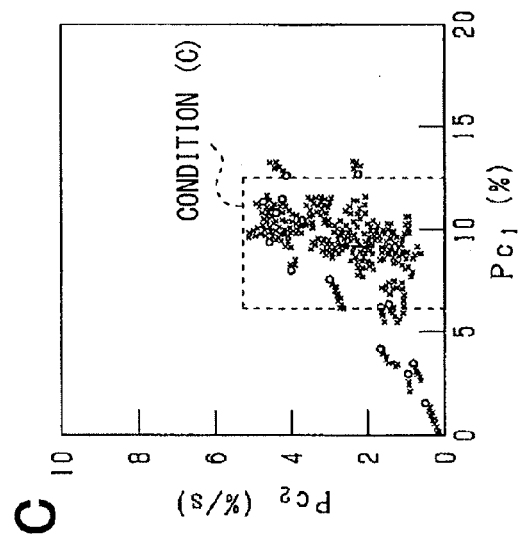
FIG. 3D is a graph of a correlation between the condition (D) and a state of the driver.

FIGS. 3A to 3D show the correlations between each Parameter and the absentminded state. In FIG. 3A, a lateral axis and a vertical axis respectively indicate the Parameter Pa1 and the Parameter Pa2. In FIG. 3B, a lateral axis and a vertical axis respectively indicate the Parameter Pb1 and the Parameter Pb2, In FIG. 3C, a lateral axis and a vertical axis respectively indicate the Parameter Pc1 and the Parameter Pc2, In FIG. 3D, a lateral axis and a vertical axis respectively indicate the Parameter Pd1 and the Parameter Pd2. Further, in FIGS. 3A to 3D, "x" indicates the absentminded state and "○" indicates the non-absentminded state (i.e., the normal state).

According to the experiment, as shown in FIGS. 3A to 3D, a number of "x" falling into regions where each condition (A) to (D) is satisfied is greater than that falling into regions where each condition (A) to (D) is not satisfied. In other words, it can be said that the test driver is more likely to be in the absentminded state as the conditions (A) to (D) are satisfied.

It is to be noted that the determination unit 14 determines whether the driver is driving in the absentminded state every given time. In the present embodiment, the determination unit 14 determines whether the driver is driving in the absentminded state every 3 minutes. After the determination, the determination unit 14 outputs the result into the controller 16.

(The Controller 16)

The controller 16 controls the execution unit 18 to execute applications A1 to A7. The controller 16 has a memory device (not shown) and the memory device stores plural kinds of the applications A1 to A7 (i.e., programs) for improving the driver's awareness level. In the present embodiment, 7 kinds of the applications A1 to A7 are stored in the memory device. The controller 16 selects the applications A1 to A7 to be executed according to a degree of the absentminded state of a driver (i.e., the driver's awareness level).

The controller 16 may be configured to download or update the applications A1 to A7 through the Internet. As described below, the applications A1 to A7 are generally classified into 2 groups, i.e., a low-stimulus group and a high-stimulus group. The low-stimulus group is categorized as a group having a lower effect for improving the driver's awareness level. Whereas, the high-stimulus group is categorized as a group having a higher effect for improving the driver's awareness level (see FIG. 4).

The controller 16 determines the driver's awareness level based on a period for which the driver is driving in the absentminded state. More specifically, when the determination unit 14 determines that the driver is driving in the absentminded state, the controller 16 sets a flag indicating the absentminded state (hereinafter, "absentminded state flag") to be an ON state and starts counting an elapsed time since the controller 16 determines that a driver is driving in the absentminded state.

The controller 16 previously stores a reference time for the elapsed time and determines the driver's awareness level based on the result whether the elapsed time is longer than the reference time. The reference time may be set to, for example, 6 minutes.

When the driver has spent less time in the absentminded state, the driver's awareness level is relatively high, i.e., the degree of the absentminded state is low. Therefore, when the elapsed time is shorter than the reference time, the controller 16 selects the applications A1 to A4 categorized in the low-stimulus group.

Whereas, when the driver has spent much time in the absentminded state, the driver's awareness level is relatively low, i.e., the degree of the absentminded state is high. Therefore, when the elapsed time is longer than the reference time, the controller 16 selects the applications A5 to A7 categorized in the high-stimulus group.

Figures 4, 5:
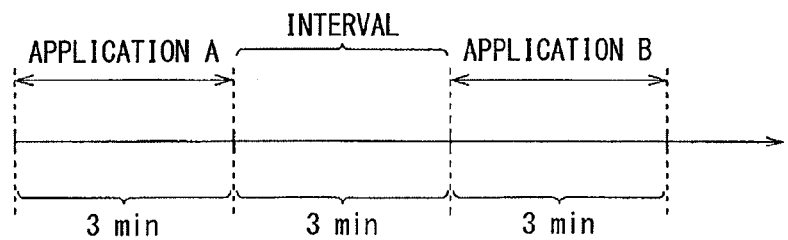
FIG. 4 is a table categorizing applications in the embodiment.
FIG. 5 is an explanatory chart illustrating timing of executing the applications.

As described above, the determination unit 14 determines whether the driver is driving in the absentminded state every 3 minutes. Therefore, as shown in FIG. 5, after the execution of one of the application A1 to A7, the controller 16 controls the execution unit 18 to execute an other of the application A1 to A7 with an interval time for at least 3 minutes. The interval time is not necessarily set to exactly 3 minutes. For example, the interval time (i.e., a determination period for the determination unit 14) may be set between 2 minutes 45 seconds and 3 minutes 15 seconds.

When the determination unit 14 determines that the driver is not driving in the absentminded state, i.e., the driver has recovered from the absentminded state, the controller 16 sets the absentminded state flag to be an OFF state and stops counting the elapsed time, i.e., resets the elapsed time. In this case, the controller 16 does not select the applications A1 to A7, i.e., the applications A1 to A7 are not executed.

As shown in FIG. 5, the controller 16 selects one of the applications A1 to A7 in an order such that the same applications A1 to A7 are not successively selected. In other words, one of the applications A1 to A7 is executed by the execution unit 18 in an order that is always different from the previous execution of the applications A1 to A7.

Figure 6:
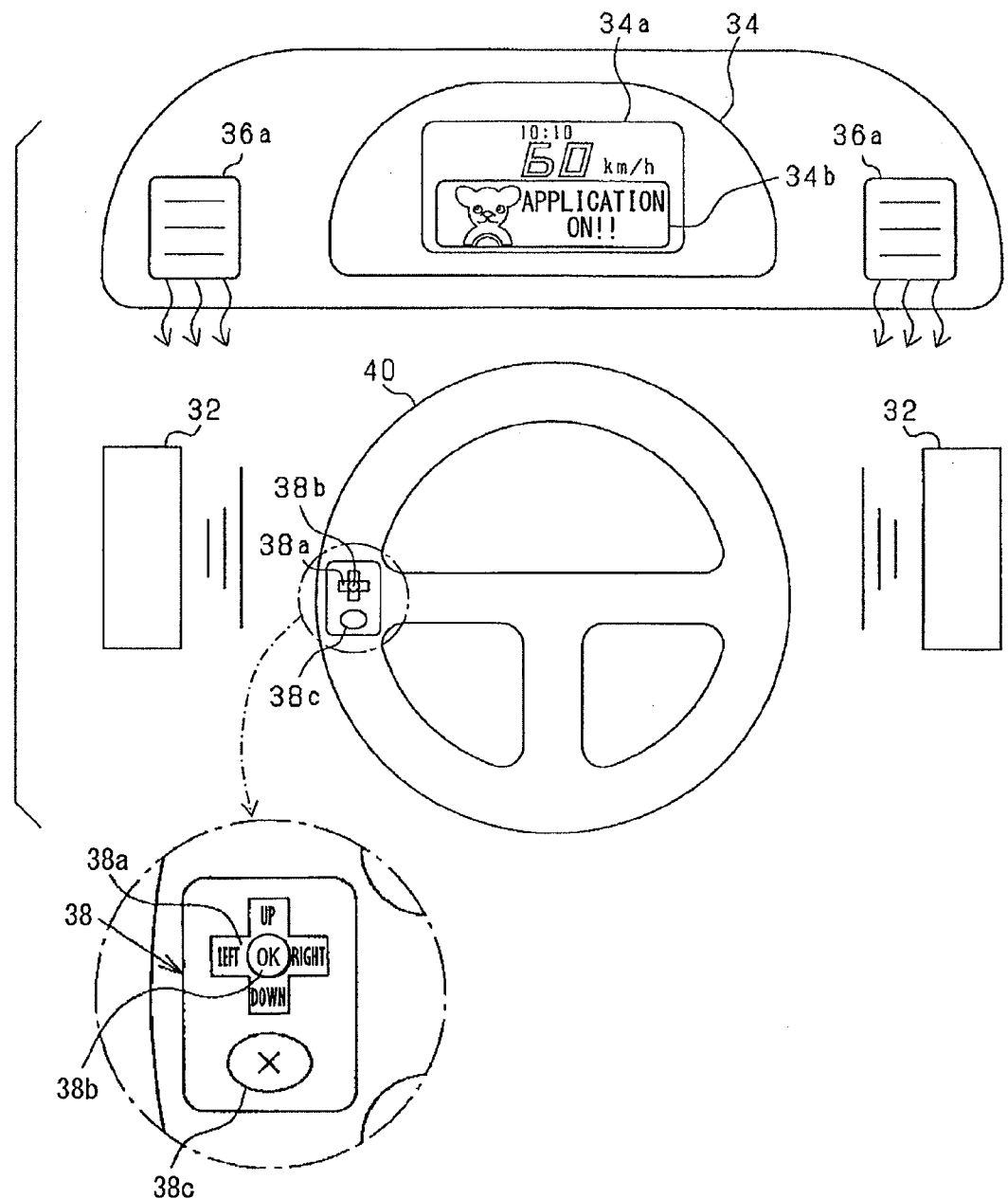
FIG. 6 is a diagram schematically illustrating an execution unit.

As shown in FIG. 6, in the present embodiment, the execution unit 18 includes a speaker 32, a display 34, an air conditioner 36 (i.e., a temperature control device), and an operation button 38.

The speaker 32 is disposed inside the vehicle and outputs a voice guide, background music (i.e., BGM), or the like, when the applications A1 to A7 are executed as described below.

The display 34 is disposed inside of an instrumental panel of the vehicle. The display 34 may be a TFT (thin-film transistor) crystal display meter to display an image such as the vehicle speed (hereinafter a "meter image 34a"). The display 34 displays the images according to the application A1 to A7 that is selected.

The air conditioner 36 operates when the application A5 is selected as described below. The air conditioner 36 blows conditioned air (e.g., cold air) to a driver through an air outlet 36a provided on the instrumental panel.

The operation button 38 is disposed on the steering 40 and manipulated by the driver. As shown in FIG. 6, the operation button 38 includes a direction button 38a, a decision button 38b, and a cancellation button 38c. The operation button 38 is manipulated to indicate (i.e., select) directions "UP", "DOWN", "LEFT", and "RIGHT", The direction button 38a and the decision button 38b are manipulated by the driver according to an instruction as described below when the application A7 is selected. The cancellation button 38c is manipulated when the driver wants to stop the applications A1 to A7 that is being executing.

(The Applications A1 to A7)

Next, the respective contents of the applications A1 to A7 will be described below. As shown in FIG. 4, the low-stimulus group includes the applications A1 to A4 and the high-stimulus group includes the applications A5 to A7. The applications A1 to A4 categorized in the low-stimulus group are further categorized into a first class and a second class. The applications A5 to A7 categorized in the high stimulus group are further categorized into a third class and a fourth class.

Each execution time of the applications A1 to A7 is set to 3 minutes. However, the execution time is not necessarily set to exactly 3 minutes, and, the execution time may be set to, for example, between 2 minutes 45 seconds and 3 minutes 15 seconds.

The applications categorized in the first class act on a visual sense, a hearing sense, and a touching sense of the driver. That is, the applications categorized in the first class improve the driver's awareness level by providing at least an image displayed by the display 34, sound output from the speaker 32, and the conditioned air blown from the air conditioner 36. The applications categorized in the first class stimulate cognitive function of the driver such as the visual sense or the hearing sense. Thus, the stimulus to the driver by the applications categorized in the first class is low and effects for improving the driver's awareness level are relatively small.

In the present embodiment, a background color changing application A1 and a noise sound application A2 are categorized into the first class.

In the background color changing application A1, a background color in the meter image 34a displayed on the display 34 gradually changes over time. As shown in FIG. 7A, the background color changes such that a lighting area having a circle shape indicated by dots gradually expands from the center of the meter image 34a toward the entire region thereof. In the background color changing application A1, a period for 60 seconds from the start of changing the background color to the end thereof is defined as one performance and the performance is executed 2 times within 3 minutes. Further, an interval of 60 seconds is set between two performances.

In the background color changing application A1, a message that causes the driver to recognize that the driver is driving in the absentminded state is displayed on the display 34 every time each performance of the background color changing application A1 ends. The message is, for example, "YOU MIGHT BE TIRED". However, the message is not displayed when the driver notices the change of the background color and pushes the decision button 38b during the performance of the background color changing application A1.

As shown in FIG. 7B, in the noise sound application A2, noise sound is intermittently output from the speaker 32, More specifically, as shown in FIG. 7B, the speaker 32 outputs the noise sound fore given time (e.g., 35 seconds) and then stops outputting the noise sound for a given time (e.g., 35 seconds) and the outputting and stopping of the noise sound is repeated.

Further, in the noise sound application A2, the display 34 displays an execution image 34b with a message such as "APPLICATION ON" during outputting the noise sound. The execution image 34b causes the driver to recognize that an application is being executed. The execution image 34b is displayed such that the execution image 34b overlaps the meter image 34a, i.e., the execution image 34b is displayed as a pop-up image.

The applications categorized into the second class prompt the driver to perform a body motion (i.e., exercising). That is, the applications categorized in the second class stimulate a proprioceptive sense that is a consciousness toward driver's body (i.e., a unique sense) by performing the body motion, and as a result improves the driver's awareness level. Therefore, the stimulus to the driver by the applications categorized in the second class is higher than that of the applications categorized in the first class. Thus, the improvement to the driver's awareness level is greater.

In the present embodiment, a driving exercise application A3 (i.e., body motion application) and a pronouncing application A4 (i.e., body motion application) are categorized as the second class.

In the driving exercise application A3, voice guide for exercising is output from the speaker 32 and prompts the driver to exercise. The display 34 displays the execution image 34b during executing the driving exercise application A3. The exercise that the driving exercise application A3 requests the driver to perform is a simple exercise that has no influence on driving. For example, as shown in FIG. 8A, the exercise may include a stretching of a driver's face (i.e., "facial stretching") and a stretching of a driver's back muscle (i.e., "back muscle stretching").

Further, an introduction performance is executed when the driving exercise application A3 is activated. In the introduction performance, voice is output from the speaker 32 to notify the driver of the start of the application. By outputting the voice, the hearing sense of the driver is also stimulated. Further, in the driving exercise application A3, voice guide prompting the driver to make a safety confirmation is also output after the introduction performance. Specifically, the driver is asked to check a rear-view mirror (not shown) or side mirrors (not sown) to confirm a safety around the vehicle. In the safety confirmation, the proprioceptive sense of the driver is also stimulated since the driver makes actions to move the driver's sightline.

In the pronouncing application A4, the guide voice is output from the speaker 32 to prompt the driver to vocally respond according to the guide voice. The display 34 displays the execution image 34b during executing the pronouncing application A4. The pronunciation that the pronouncing application A4 requests the driver to make is a simple pronunciation that has no influence on driving. For example, as shown in FIG. 8B, the pronunciation may include a "voice training" that requests the driver to produce sounds in both a high-tone range and a low-tone range, a "loud voice" that requests the driver to produce a loud voice, and a "tongue twister" that requests the driver to repeat a tongue twister. The introduction performance is also executed when the pronouncing application A4 is activated.

The applications categorized in the third class act on the visual sense, the hearing sense, and the touching sense of the driver as well as an affect (i.e., an emotion) of a driver. That is, the applications categorized in the third class stimulate the affect (the emotion) of a driver, such as a refreshing sensation or pleasantness, in addition to the cognitive function. Thus, the stimulus to the driver by the applications of the third class is greater than that of the applications categorized in the first and the second classes, and thus, the effects for improving the driver's awareness level are enhanced.

In the present embodiment, a refreshing application A5 and a character application A6 are categorized as the third class.

As shown in FIG. 9A, in the refreshing application A5, the conditioned air is blown from the air conditioner 36 and a sound effect, such as a sound of a stream, for example, is output from the speaker 32. In other words, in the refreshing application A5, the stimulus to the hearing sense (i.e., audio stimulus) and the stimulus to the touching sense (i.e., touch stimulus) by the conditioned air and the stimulus to the affect (i.e., the refreshing feeling) by the sound effect are applied to the driver at the same time.

In the refreshing application A5, the blow of the conditioned air and the output of the sound effect are intermittently executed. That is, a performance for 20 seconds in which the conditioned air is blown and the sound effect is output is defined as a single unit and the performance is repeatedly executed in an interval of 20 seconds between consecutive performances. The display 34 displays the execution image 34b during executing each performance.

In the character application A6, parts of a character face are displayed in order on the display 34. As shown in FIG. 9B, the character face is eventually displayed on the display 34 as a strange face (i.e., make-a-face game). In other words, the character face is eventually displayed in a state in which the parts (i.e., a left eye, a right eye, a nose, and a mouth of the character face) are displayed in a position deviated from the normal position. Therefore, in the character application A6, the stimulus to the visual sense and the stimulus to the affect (i.e., interest in or the pleasantness to the character face) are applied to the driver at the same time.

As shown in FIG. 9B, in the character application A6, a contour of the character face is displayed first, and then, the right eye, the left eye, the nose, and the mouth are displayed in this order. Eventually, the character face is displayed with each part at a strange position. Further, the introduction performance is executed when the character application A6 is activated.

The application categorized in the fourth class prompts the driver to perform the body motion (i.e., to exercise) and acts on the affect of the driver. That is, the application in the fourth class stimulates the affect of the driver, such as the refreshing sensation or the pleasantness, in addition to the proprioceptive sense. Therefore, the stimulus to the driver by the application in the fourth class is higher than those of the applications of the first and the second classes, and effects for improving the driver's awareness level are enhanced. Further, since the application categorized in the fourth class stimulates the proprioceptive sense, the stimulus to the driver and the effects for improving the awareness level are slightly greater than those of the applications in the third class.

In the present embodiment, a button operation application A7 (i.e., a body motion application) is categorized as the fourth class. In the button operation application A7, the voice guide is output from the speaker 32 to prompt the driver to manipulate (i.e., to press) the operation button 38. Further, when the driver presses the operation button 38 according to the voice guide, the sound effect is output from the speaker 32. In other words, the button operation application A7 provides a kind of game involving driver's manipulations. That is, in the button operation application A7, the stimulus to the proprioceptive sense by pressing the operation button 38 and stimulus to the affect (i.e., an enjoyment of playing a game or an interest in the game) are applied to the driver at the same time.

Specifically, as shown in FIG. 10, the voice guide is output from the speaker 32 to request the driver to press the operation button 38 100 times in a minute. When the driver presses either of "UP", "DOWN", "LEFT", or "RIGHT" of the direction button 38a, the speaker 32 outputs the sound effect such as popping sounds.

Further, in the button operation application A7, the speaker 32 outputs the voice guide request the driver to make a sound (i.e., to press the direction button 38a) to music output from the speaker 32. When the driver presses the direction button 38a to the rhythm of the music, the speaker 32 outputs the sound effect according to the pressing timing of the direction button 38a. The introduction performance is also executed when the button operation application A7 is activated.

Figure 11:
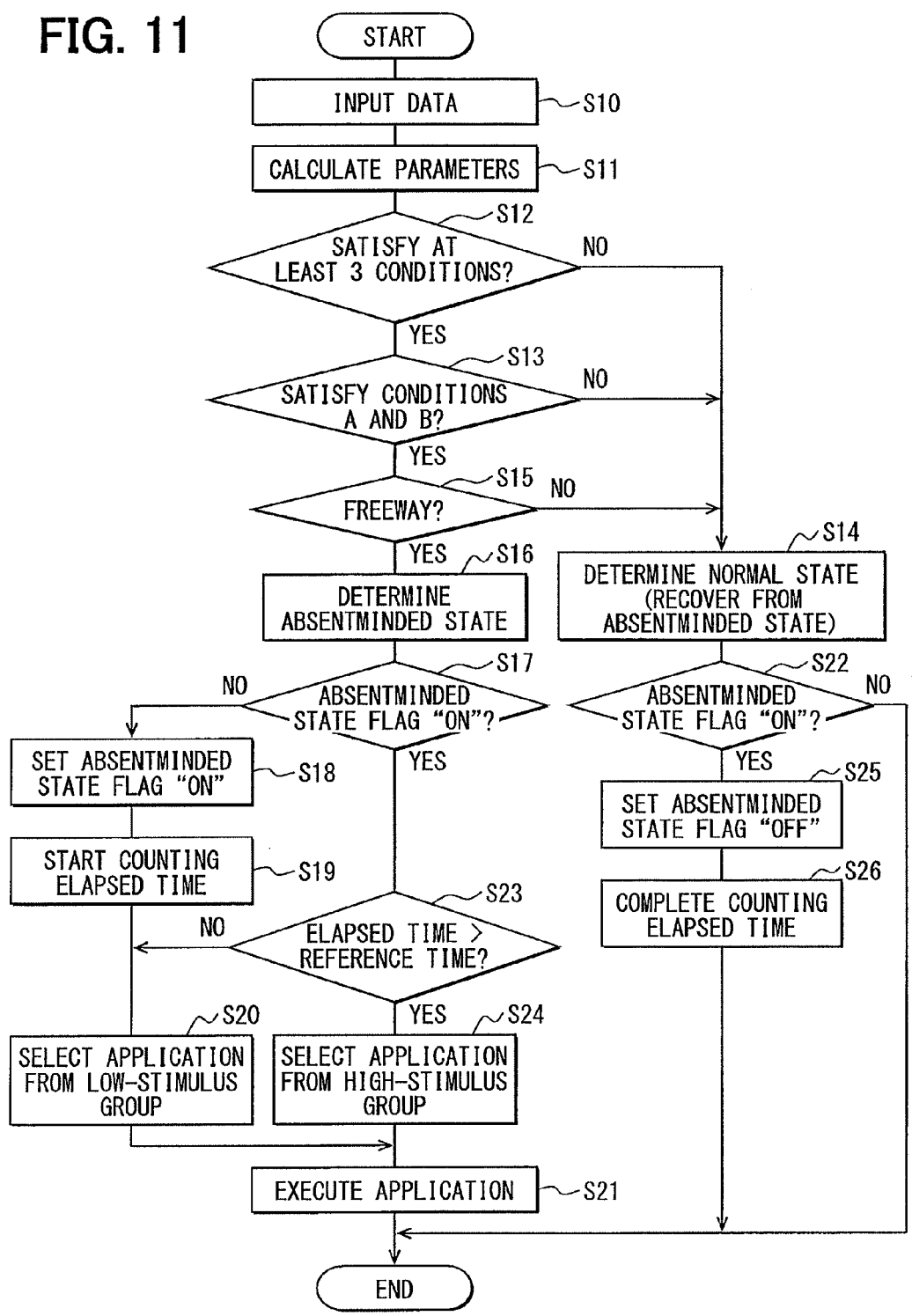
FIG. 11 is a flow chart illustrating a control process of the awareness level improvement device in the embodiment.

Next, an operation according to the present embodiment will be described below. FIG. 11 shows a flow chart illustrating a controlling process by the device 10.

(Where the Absentminded State Flag is Set to be the OFF State)

First, a case where the determination unit 14 has never determined the absentminded state and the absentminded state flag is set to be the OFF state will be described.

The detection unit 20 acquires data while the driver drives the vehicle. That is, the accelerator pedal sensor 22, the brake pedal sensor 24, the steering angle sensor 26, the speed sensor 28 and the navigation system 30 respectively detect the accelerator pedal depressing amount, the brake pedal depressing amount, the steering angle, the vehicle speed, and the type of the road. The data detected by the detection unit 20 is input into the input unit 12 (Step S10). The input unit 12 sequentially stores the data acquired at each process of Step S10.

Next, the determination unit 14 calculates the Parameters Pa1, Pa2, Pb1, Pb2, Pc2, and Pc3 based on the data input into the input unit 12 (Step S11). The determination unit 14 determines whether at least 3 conditions among the conditions (A) to (D) are satisfied by using the parameters (Step S12).

When at least 3 conditions among the conditions (A) to (D) are satisfied ("Yes" in Step S12), the determination unit 14 further determines whether both of the conditions (A) and (B) are satisfied (Step S13). On the other hand, when not more than 2 conditions among the conditions (A) to (D) are satisfied ("No" in Step S12), the determination unit 14 determines that the driver is in the normal state (Step S14).

When both the conditions (A) and (B) are satisfied in Step S13 ("Yes" in Step S13), the determination unit 14 determines whether the type of the road detected by the navigation system 30 is a freeway (Step S15). When both the conditions (A) and (B) are not satisfied ("No" in Step S13), the determination unit 14 determines that the driver is in the normal state (Step S14).

The determination unit 14 determines that the driver is driving in the absentminded state (Step S16) when the type of the road on which the vehicle is driving is a freeway in Step S15. Whereas, the determination unit 14 determines that the driver is in the normal state (Step 014) when the type of the road on which the vehicle is driving is a general road (i.e., a road except for the freeway) ("No" in Step S15).

When the determination unit 14 determines that the driver is driving in the absentminded state (Step S16), the controller 16 determines whether the absentminded state flag is set to be the ON state (Step S17), in this instance, the absentminded state flag is set to be the OFF state ("No" in Step S17), the controller 16 sets the absentminded state flag to be the ON state (Step S18). And then, the controller 16 starts counting the elapsed time of the absentminded state (Step S19).

Next, the controller 16 selects the application. In this case, since the determination unit 14 determines the absentminded state for the first time, only a short time elapses after the driver falls into the absentminded state and the driver's awareness level is relatively high (i.e., the degree of the absentminded state is low). Therefore, the controller 16 selects either one of the applications A1, A2, A3, or A4 categorized in the low-stimulus group (Step S20). And then, the controller 16 controls the execution unit 18 to execute the application A1, A2, A3, or A4 selected (Step S21).

Since in the application A1, A2, A3, or A4 that is categorized in the low-stimulus group, the stimulus to the driver is relatively low, the driver can be prevented from feeling burdened by the application A1, A2, A3, or A4.

Further, although the application A1, A2, A3, or A4 is categorized in the low-stimulus group, the driver's awareness level can be improved by stimulating the cognitive function and the proprioceptive sense. Therefore, it is possible to assist the driver to recover from the absentminded state to the normal state. In other words, the driver can be prevented from falling into a further lower awareness level (e.g., a drowsy state) from the absentminded state.

On the other hand, when the determination unit 14 determines the normal state (Step S14), the controller 16 determines whether the absentminded state flag is set to be the ON state (Step S22). Since the absentminded state flag is set to be the OFF state ("No" in Step S22), the controller 16 terminates the process without executing the application A1 to A7.

As described above, when the determination unit 14 determines that the driver is driving in the normal state (i.e., not in the absentminded state), the controller 16 does not execute the application A1 to A7. Therefore, it is possible to avoid such a situation that the driver feels burdened by the applications executed even when the driver's awareness level is high. (Where the Absentminded State Flag is Set to be the ON State)

Next, a case where the absentminded stated flag is set to be the ON state, i.e., the determination unit 14 has already determined the absentminded state will be described below. First, a case in which the absentminded state of the driver has been going (i.e., "Yes" in either of Steps S12, S13, or S15) will be described. When the determination unit 14 determines that the driver is driving in the absentminded state (Step S16), the controller 16 determines whether the absentminded flag is set to be the ON state (Step S17). Since, the absentminded state is set to be the ON state ("Yes" in Step S17) in this instance, the controller 16 determines whether the elapsed time of the absentminded state is longer than the reference time (Step S23).

When the elapsed time of the absentminded state is longer than the reference time ("Yes" in Step S23), it means that the driver has been in the absentminded state for a long time. In this case, the driver's awareness level is likely to be low (i.e., the degree of the absentminded stated is high), it is necessary to execute the application A1 to A7 having high effects for improving the driver's awareness level.

Therefore, the controller 16 selects the application A5, A6, or A7 that is categorized in the high-stimulus group (Step S24) and controls the execution unit 18 to execute the application A5, A6, or A7 (Step S21). As a result, since, in addition to the cognitive function or the proprioceptive sense, the affect of the driver is stimulated, the driver's awareness level can be improved. Further, the driver can maintain the high awareness level for a long time due to the application A5 to A7 having the high improvement effects. It is to be noted that the controller 16 selects the application A5 to A7 that is different from the application A5 to A7 that was previously selected. Therefore, the same applications A5 to A7 are not successively executed, and thus the driver can be prevented from becoming tired with the applications A5 to A7.

On the other hand, when the elapsed time of the absentminded state is shorter than the reference time ("No" in Step S23), the degree of the absentminded state is relatively low. In this case, the controller 16 selects the application A1 to A4 that is categorized in the low-stimulus group (Step S20) and controls the execution unit 18 to execute the application A1 to A4 selected (Step S21). In this case, the controller 16 selects the application A1 to A4 that is different from the application A1 to A4 that is previously selected. Thus, it is possible to maintain the driver's interest in the application A1 to A4.

As described above, the controller 16 selects the application A1 to A7 according to the elapsed time. Therefore, the application A5 to A7 that is categorized in the high-stimulus group and has a high stimulus to the driver is not selected when the driver's awareness level is relatively high. In other words, since the application A1 to A4 having a low stimulus to the driver is executed when the driver's awareness level is relatively high, the driver can be prevented from feeling burdened by the application A1 to A4.

As described above, the determination unit 14 determines every 3 minutes whether the driver is driving in the absentminded state. Therefore, as shown in FIG. 5, the application A1 to A7 is intermittently executed every 3 minutes. As a result, in comparison with a case in which the respective applications A1 to A7 are executed for a long period, the driver can enjoy a variety of performances. Therefore, the application A1 to A7 can be prevented from becoming stereotyped and thus the driver's awareness level can be improved.

Next, a case where the determination unit 14 determines that the driver has recovered from the absentminded state will be described. In this case, since either of Step S12, S13, or S15 is determined not to occur, the determination unit 14 determines the normal state (Step S14). Since the absentminded state flag is set to be the ON state ("Yes" in Step 22), controller 16 changes the absentminded state flag to be the OFF state (Step S25). Next, the controller 16 completes counting the elapsed time of the absentminded state (Step S26) and ends the process.

As described above, even when the absentminded flag is set to be the ON state, the application A1 to A1 is not executed as far as the driver has already recovered from the absentminded state. Therefore, it is possible to avoid such a situation that the driver feels the burdened by the application A1 to A1 executed even when the driver's awareness level is high.

According to the device 10 of the present embodiment, effects can be acquired as described below.

(1) When the determination unit 14 determines the absentminded state and the controller 16 selects the application A3, A4, or A7 that prompts the driver to perform the body motion, the driver's awareness level can be improved by causing the driver to perform the body motion according to the application A3, A4, or A7. As a result, the driver can recover from the absentminded state.

Further, since the determination unit 14 determines whether the driver is driving in the absentminded state, the driver's awareness level can be improved before the driver is falls into the drowsy state from the absentminded state. As a result, the driver can safely drive the vehicle.

(2) When the determination unit 14 determines that the driver is driving in the absentminded state, the controller 16 properly selects the application A1 to A7 among a variety of the applications A1 to A7 and controls the execution unit 18 to execute the application A1 to A7 selected. Further, the applications A1 to A7 have the effects for improving the driver's awareness level that are different from each other, and the controller 16 selects one of the applications A1 to A7 according to the driver's awareness level.

That is, when the driver's awareness level is high, the application A1 to A4 having the low stimulus to the driver is selected so that the driver's awareness level can be improved with a suitable stimulus to the driver, Therefore, the driver can be prevented from feeling burdened by the application A1 to A4. On the other hand, when the driver's awareness level is low, the application A5 to A7 having the high stimulus to the driver is selected so that the driver's awareness level can be improved with a higher stimulus to the driver.

(3) The controller 16 estimates the driver's awareness level based on the elapsed time since the driver falls into the absentminded state, the driver's awareness level can be accurately determined. Further, the applications A1 to A7 are categorized into the low-stimulus group or the high-stimulus group and the controller 16 selects the application A1 to A7 from either one of the low-stimulus or the high-stimulus group according to the driver's awareness level. Therefore, the controller 16 easily selects the application A1 to A7 and thus control load on the controller 16 can be reduced.

The first and the second classes categorized into the low-stimulus group stimulate the cognitive function and the proprioceptive sense of the driver. Therefore, the driver's awareness level can be improved with the relatively low stimulus by the applications of the first or the second classes.

On the other hand, the third and the fourth classes categorized into the high-stimulus group act on the affect of the driver in addition to the stimulus to the cognitive function and the proprioceptive sense. Thus, the stimulus to the driver increases and the driver's awareness level can be greatly improved.

The introduction performance is executed in the applications A3, A4, A6, and A7 when the application A3, A4, A6, or A7 is activated. Therefore, an interest of the driver in the application A3, A4, A5, or A7 can be enhanced at once at the beginning of the application A3, A4, A6, or A7, and the driver's awareness level can be more improved.

In the background color changing application A1, the background color in the meter image 34*a* displayed on the display 34 gradually changes over time. When the driver is driving in the absentminded state, the driver hardly notices the slight change in the background color. When the driver does not notice the change in the background color, the message "YOU MIGHT BE TIRED" is displayed on the display 34. Therefore, the driver recognizes the absentminded state. However, the message is not displayed when the driver notices the change in the background color and presses the decision button 38*b*. Thus, the absentminded state of the driver can be prevented from being known by other occupants of the vehicle by pressing the decision button 38*b*.

In the noise sound application A2, since the noise sound is output from the speaker 32, the driver's awareness level can be improved. Further, since the noise sound is intermittently output, the improvement effects of the awareness level increase in comparison with a case in which the noise sound is continuously output. The execution image 34*b* is displayed on the display 34 during outputting the noise sound so that the driver can be prevented from mistaking the noise sound as failure of the speaker 32.

In the driving exercise application A3, the voice guide that prompts the driver to exercise is output from the speaker 32. Therefore, when the driver exercises according to the voice guide, the proprioceptive sense is stimulated and the driver's awareness level can be improved.

Further, in the driving exercise application A3, the voice guide output from the speaker 32 prompts the driver to make the safety confirmation involving movement of the driver's sightline. Therefore, the driver's awareness level is improved by the movement of the driver's sightline while improving safety driving by the driver.

In the driving exercise application A3, the driver is prompted to perform the facial stretching and the back muscle stretching. Therefore, the driver's awareness level can be improved when the driver stretches the driver's face and back according to the driving exercise application A3. Further, since the driver can refresh the driver's body and mind by performing the stretching, a driver's stress during driving can be reduced.

In the pronouncing application A4, the guide voice that prompts the driver to vocally respond is output from the speaker 32. Therefore, the proprioceptive sense of the driver is stimulated by vocally responding according to the voice guide and the driver's awareness level can be improved. The driver can also refresh by vocally responding and reduce the driver's stress during driving.

In the refreshing application A5, the conditioned air is blown from the air conditioner 36 and the sound effect is output from the speaker 32. Therefore, the audio stimulus by the sound effect and the touch stimulus by the conditioned air and the stimulus to the affect of the driver by the sound effect are applied at the same time. Thus, the effects for improving the awareness level are great and the driver's awareness level can be improved.

In the character application A6, the parts of the character face are displayed in order on the display 34 and the character face eventually displayed in the state in which the parts are displayed in the position deviated from the normal position. Therefore, the stimulus to the visual sense by the character face and the stimulus to the affect such as the interest or the pleasantness to the character face are applied to the driver at the same time. Thus, the driver's awareness level can be efficiently improved to recover from the absentminded state.

In the button operation application A7, the voice guide that prompts the driver to press the operation button 38 is output from the speaker 32. Therefore, the stimulus to the proprioceptive sense by pressing the operation button 38 and the stimulus to the affect such as the enjoyment of playing of the game or the interest in the game are applied to the driver at the same time. As a result, the driver's interest in the button operation application A7 can be maintained, and the driver's awareness level can be improved. Further, the introduction performance is also executed in the button operation application A7 when the application A7 is activated, the effects for improving the awareness is further improved.

As described above, each execution time of the applications A1 to A7 is set to 3 minutes. That is, since the performance of each application A1 to A7 is executed for a proper time, the driver can be suppressed to feel burdened by the applications A1 to A7. Further, when the applications A1 to A7 are successively executed, the interval time for 3 minutes is set between two consecutive applications. With this, the applications A1 to A7 can be prevented from becoming stereotyped. In other words, it is possible to enhance the driver's desires for participation in the applications A1 to A7.

Furthermore, even when the driver feels burdened by the application A1 to A7, the driver can stop the application A1 to A7 by just pressing the cancellation button 38c.

(4) According to the present embodiment, since the device 10 determines whether the driver is driving in the absentminded state by using the conditions (A) to (D), the absentminded state can be precisely determined. Further, the device 10 determines the absentminded state when both the conditions (A) and (B) are satisfied. By introducing the requirement that the conditions (A) and (B) are satisfied, the driver's state when driving on the general road is excluded. Therefore, the absentminded state can be further precisely determined.

The device 10 determines the absentminded state only when the type of the road input from the navigation system 30 is the freeway. Therefore, the device 10 can more precisely determine whether the driver is driving in the absentminded state.

(Various Modifications)

Although the present disclosure has been fully described in connection with the preferred embodiment thereof with reference to the accompanying drawings, it is to be noted that various changes and modifications will become apparent to those skilled in the art.

It is not necessarily limited to the applications as described above. Other applications may be executed as far as the driver's awareness level can be improved. It is also not necessarily limited to the execution portion (i.e., the execution unit) as described above. For example, a seat heater provided inside a driver seat may be used as the execution portion. In this case, the seat heater may operate when an application is executed.

In the embodiment, the safety confirmation, the facial stretching, and the back muscle stretching are performed when the driving exercise application A3 is executed. However, a request that prompts a driver to properly adjust (or alter) a seating position may be executed in place of the back stretching in the driver exercise application A3. The proprioceptive sense of the driver is stimulated when the driver adjusts the seating position, and thus, the driver's awareness level can be improved. Furthermore, after the driver adjusts the seating position to a proper position according to the request, the driver can safely drive the vehicle.

In the above-described embodiment, seven kinds of the applications A1 to A7 that are categorized into the first to the fourth classes are used. However, only the applications that prompt the driver to perform the body motion may be used. For example, the execution portion may execute one of the applications A3, A4, and A7 that are categorized into the second or the fourth class (i.e., the body motion application).

Although the controller selects the application A1 to A7 according to the driver's awareness level as described above, it is not necessarily limited to the embodiment. For example, when the determination portion determines that the driver is in the absentminded state, the controller may randomly select the application A1 to A7 regardless of the driver's awareness level.

A directional speaker having high directivity may be used as the execution portion in place of the speaker as described in the embodiment. For example, by using the directional speaker, the noise sound can be directed only toward the driver when the noise sound application is executed. With this, since other passengers hardly hear the noise sound, the other passengers can be prevented from being disturbed by the noise sound.

Further, the directional speaker may be configured to change a directivity function. That is, the directional speaker changes the directivity function according to the application such that all passengers can hear sound or only the driver can hear the sound. For example, when the pronouncing application is selected, the directional speaker changes the directivity function so that all passengers can hear the sound and vocally respond (i.e., make sound) according to the application. On the other hand, for example, the noise sound application is selected, the direction speaker changes the directive function so that only the driver can hear the noise sound.

Further, when there is a passenger other than the driver, the controller may be set such that specified applications are not selected. For example, the applications that involve actions of the driver, such as the pronouncing application or the driving exercise application, may be not selected when there is a passenger other than the driver.

In the above-described embodiment, the driver's awareness level is estimated based on the elapsed time of the absentminded state. However, it is not necessarily limited to the embodiment. For example, the driver's awareness level may be estimated based on a cumulative number of the absentminded state flag during a given time in the past. In this instance, the driver's awareness level estimated decreases as the cumulative number of the absentminded state flag increases.

The method (i.e., process) by the controller to determine whether the driver is in the absentminded state is also not limited to the embodiment. For example, the controller may determine the absentminded state when at least 2 conditions among the conditions (A) to (D) are satisfied. Further, the condition that the type of the road is a freeway may be omitted. Conditions other than the conditions (A) to (D) may be used.

What is claimed is:

1. An awareness level improvement device for improving an awareness level of a driver, comprising:
    an input portion into which data related to the awareness level of the driver is input;
    a determination portion that determines whether the driver is driving in an absentminded state, in which the awareness level of the driver is higher than that of a drowsy driving state and lower than that of a normal driving state, based on the data input into the input portion; and
a controller that controls an execution portion to execute one of a plurality of applications improving the awareness level of the driver when the determination portion determines that the driver is driving in the absentminded state, wherein
the plurality of applications include a body motion application that prompts the driver to perform a body motion,
the plurality of applications are classified into a low-stimulus group where stimulus to the driver is low and a high-stimulus group where stimulus to the driver is high,
the controller executes one of the plurality of applications from the high-stimulus group when an elapsed time of the absentminded state exceeds a reference time, and
the controller executes one of the plurality of applications from the low-stimulus group when the elapsed time of the absentminded state is below the reference time.

2. The awareness level improvement device according to the claim 1, wherein
the body motion application prompts the driver to make a safety confirmation involving movement of a sightline of the driver.

3. The awareness level improvement device according to the claim 1, wherein
the body motion application prompts the driver to vocally respond.

4. The awareness level improvement device according to the claim 1, wherein
the body motion application prompts the driver to perform facial stretching.

5. The awareness level improvement device according to the claim 1, wherein
the body motion application prompts the driver to perform back muscle stretching or to adjust a seating position of the driver.

6. The awareness level improvement device according to the claim 1, wherein
the execution portion includes an operation button, and
the body motion application prompts the driver to manipulate the operation button.

7. The awareness level improvement device according to claim 1, wherein
the plurality of applications in the low-stimulus group include the body motion application that prompts the driver to perform the body motion, and
the plurality of applications in the high-stimulus group include an application that prompts the driver to perform the body motion, and that presents a stimulus that acts on an affect of the driver.

8. The awareness level improvement device according to claim 7, wherein the stimulus that acts on an affect of the driver affects an emotional state of the driver.

9. The awareness level improvement device according to claim 1, wherein
the controller controls the execution portion to execute the plurality of applications in an order so that one of the plurality of applications being executed is always different from a previously executed one of the plurality of applications.

10. The awareness level improvement device according to claim 1, further comprising
a detection unit configured to detect the attentiveness state of the driver prior to the controller executing the plurality of application, the detection unit being electrically connected to the input portion and including a plurality of sensors.

11. The awareness level improvement device according to claim 10, wherein the plurality of sensors include
an accelerator pedal sensor configured to detect an accelerator pedal depression amount, wherein
the determination unit is configured to determine whether the accelerator pedal depression amount over an accelerator-pedal set time-period is within an acceptable accelerator pedal depression range.

12. The awareness level improvement device according to claim 11, wherein the plurality of sensors include
a brake-pedal sensor configured to detect a brake-pedal depression amount, wherein
the determination unit is configured to determine whether the brake-pedal depression amount over a brake-pedal set time-period is within an acceptable brake-pedal depression range.

13. The awareness level improvement device according to claim 12, wherein the plurality of sensors include a steering-angle sensor, a speed sensor, and a navigation system.

14. The awareness level improvement device according to claim 10, wherein the plurality of sensors include
a brake-pedal sensor configured to detect a brake-pedal depression amount, wherein
the determination unit is configured to determine whether the brake-pedal depression amount over a brake-pedal set time-period is within an acceptable brake-pedal depression range.

15. The awareness level improvement device according to claim 10, wherein the plurality of sensors include
a steering-angle sensor configured to determine a steering angle, wherein
the determination unit is configured to determine whether the steering-angle over a steering-angle time-period is within an acceptable steering angle range.

16. The awareness level improvement device according to claim 10, wherein the plurality of sensors include
a speed sensor, wherein
the determination unit is configured to determine whether the speed over an average time period is within an acceptable speed range.

17. An awareness level improvement method, comprising:
detecting, via a detection unit including a plurality of sensors, a driver's current level of attentiveness and a time period of the driver's current level of attentiveness;
determining, via a determination unit, whether the driver is in an inattentive state based on the driver's current level of attentiveness;
executing, via a controller, a low-stimulus application when the driver is in an inattentive state less than a reference time period; and
executing, via the controller, a high-stimulus application when the driver is in the inattentive state longer than the reference time period.

18. The awareness level improvement method of claim 17, further comprising
determining, via the determination unit, at least one of whether a brake-pedal depression amount over a brake-pedal set time-period is within an acceptable brake-pedal depression range, whether the accelerator-pedal depression amount over an accelerator-pedal set time-period is within an acceptable accelerator-pedal depression range, whether the steering-angle over a steering-angle time-period is within an acceptable steering-angle range, and whether the driver's speed over an average time period is within an acceptable speed range.

19. The awareness level improvement method of claim 17, wherein the executing, via the controller, of the low-stimulus application includes a body motion application, and the executing, via the controller, of the high-stimulus application includes an application that prompts the driver to perform a body motion, and that presents a stimulus that acts on an affect of the driver.

20. The awareness level improvement device according to claim 18, wherein the executing, via the controller, of the high-stimulus application that presents a stimulus that acts on an affect of the driver affects an emotional state of the driver.

* * * * *